Feb. 11, 1964     H. R. UHTENWOLDT     3,120,775
MACHINE TOOL FEED MECHANISM

Filed Feb. 6, 1961     5 Sheets-Sheet 1

INVENTOR.
HERBERT R. UHTENWOLDT
BY
ATTORNEYS

Feb. 11, 1964    H. R. UHTENWOLDT    3,120,775
MACHINE TOOL FEED MECHANISM
Filed Feb. 6, 1961    5 Sheets-Sheet 2

United States Patent Office 3,120,775
Patented Feb. 11, 1964

3,120,775
MACHINE TOOL FEED MECHANISM
Herbert R. Uhtenwoldt, Wilmington, Ohio, assignor to The Cincinnati Milling Machine Co., Cincinnati, Ohio, a corporation of Ohio
Filed Feb. 6, 1961, Ser. No. 87,410
6 Claims. (Cl. 82—22)

This invention relates to a machine tool feed mechanism and is particularly suited for use in the apron of a lathe to control cross feed and longitudinal feed movements of the cutting tool carrier.

Damage to a lathe, lathe tools, and workpieces often results from excessive forces which occur between the tool carrier and the workpiece and between the tool carrier and other machine members during machine operation. If feed movement of the tool carrier is stopped before these forces become excessive this damage can be eliminated. A feed mechanism which is automatically responsive to presettable magnitudes of these forces to stop feed movement is particularly valuable, especially if both longitudinal feed and cross feed movements can be disconnected through operation of a single mechanism.

An object of this invention is to provide an automatic feed disconnect mechanism by which engagement and disengagement of cross feed and longitudinal feed is conveniently controlled.

Another object is to provide an automatic feed disconnect mechanism which will simplify normal operation of a lathe.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the preferred form, this invention controls the engagement and disengagement of a driving train of gears with a cross feed gear and a longitudinal feed gear. Feed movement of a tool carrier is produced when one of the feed gears is connected to the driving train of gears. A feed control member is selectively movable to cross feed, neutral, and longitudinal feed positions. The feed control member is connected to and controls the means by which the driving train of gears is engaged with and disengaged from the feed gears. Included in the driving train of gears is a worm gear. When resistance to feed movement reaches a predetermined magnitude, the worm gear is moved axially by the resistive torque transmitted through the driving train of gears. The axial movement of the worm gear is then used to transfer the feed control member from either of the feed positions to the neutral position to stop the feed movement and thereby prevent a build-up of excessive forces between the tool carrier and other machine components or the workpiece.

The construction and operation of the feed mechanism in the preferred form is described in the following detailed description with reference to the attached drawings in which.

Figure 1:
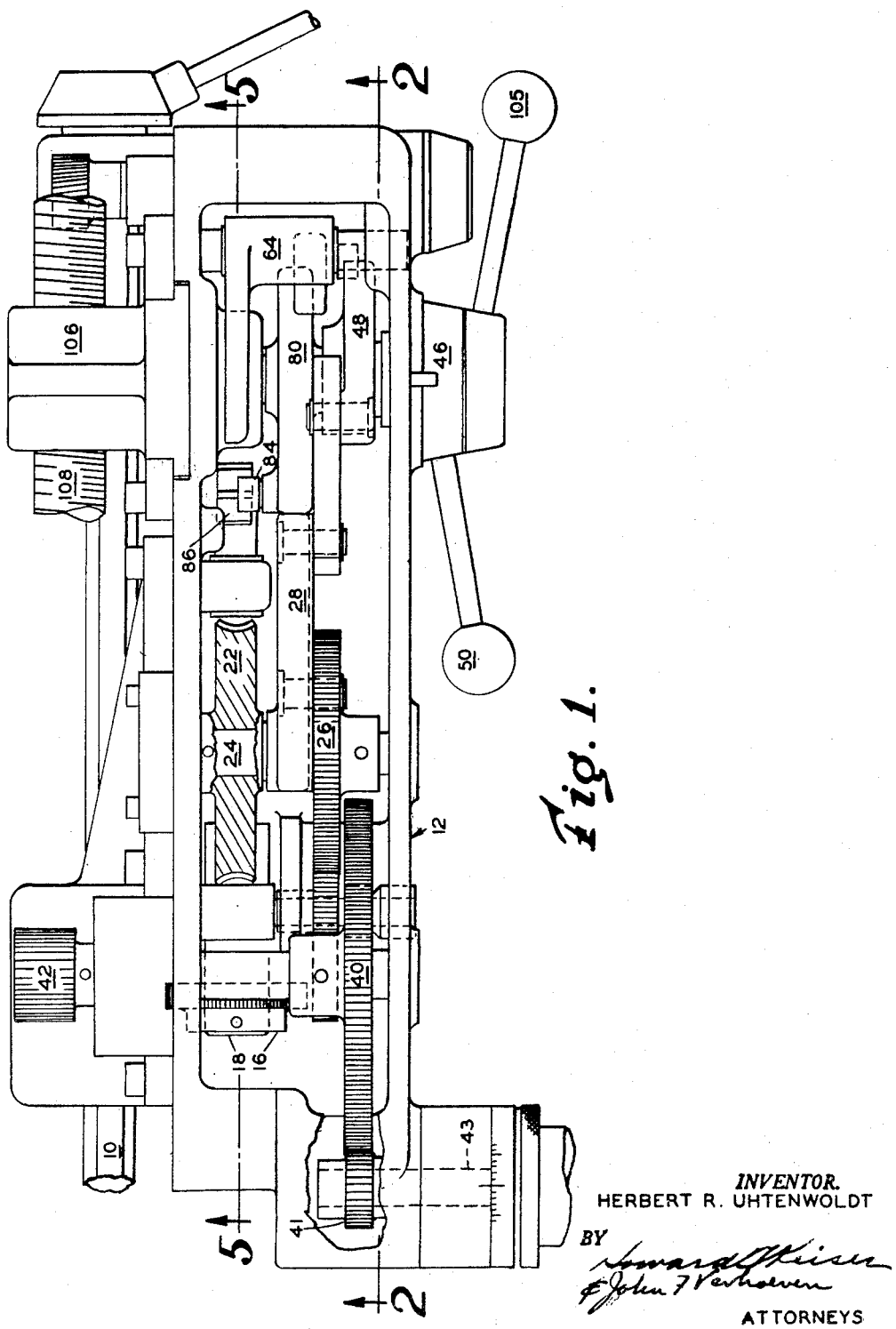
FIG. 1 shows an exposed top view of the disconnect mechanism in a lathe apron.
Figure 2:
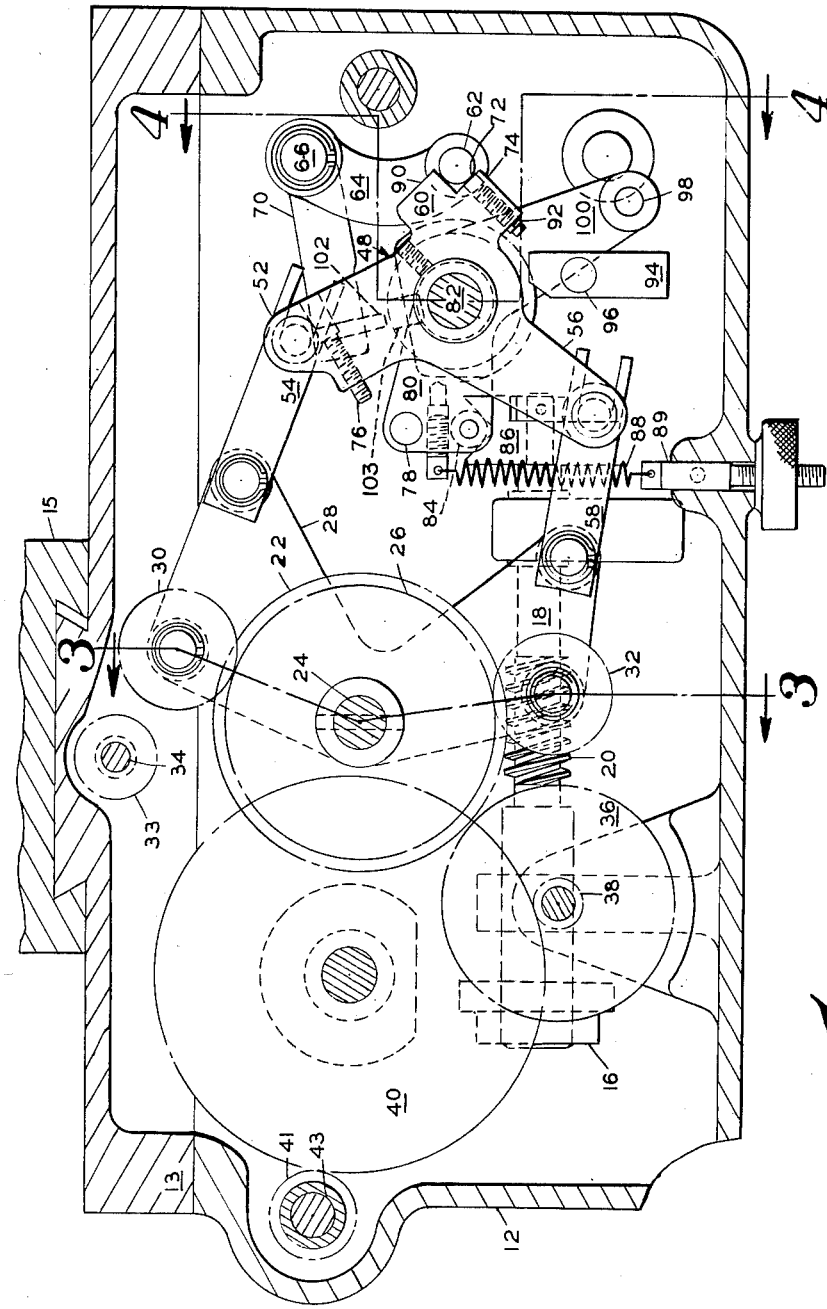
FIG. 2 is a section of FIG. 1 taken on line 2—2.
Figure 3:
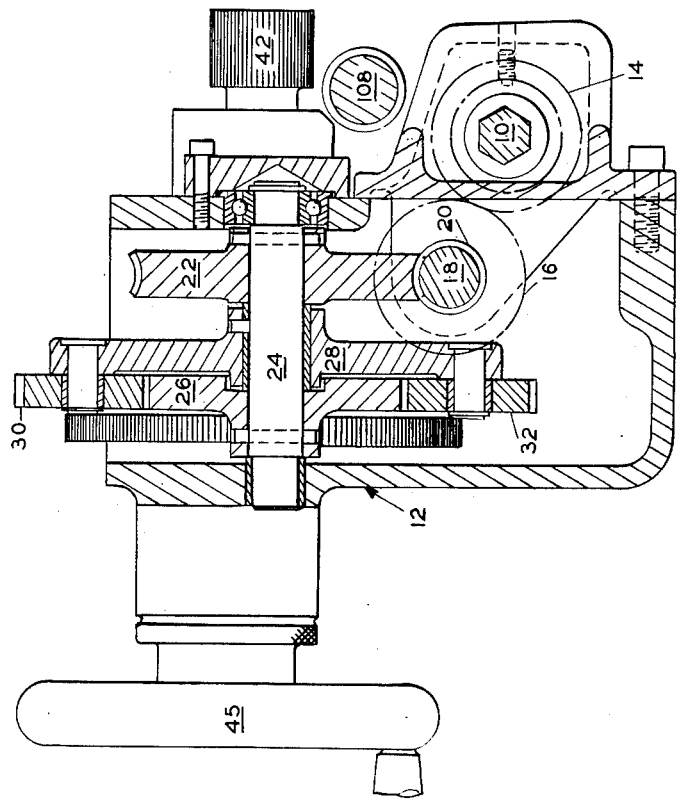
FIG. 3 is a section of FIG. 2 taken on line 3—3.

FIGS. 1 and 3 show a feed bar 10 which is rotated by a feed power source in the lathe headstock (not shown). The drive shaft comprising a feed bar 10 extends through a lathe apron housing 12 which is longitudinally movable relative to the feed bar. The housing 12 is supported by a saddle 13 (FIG. 2) which is received in a well known manner on ways (not shown) extending parallel to the feed bar 10. A cross slide 15 is received on the saddle 13 and is movable across the saddle in a direction perpendicular to the direction in which the feed bar 10 is oriented. The cross slide 15 is adapted to carry a cutting tool (not shown) to perform a machining operation. The feed bar 10 drives a feed driving train of gears including a pinion 14 which in turn drives another pinion 16 that is fixed to a torque control shaft 18. The torque control shaft 18 is rotatably received and axially movable in the apron housing 12. A worm gear 20 (FIG. 5) is also fixed to the torque control shaft 18. The worm gear 20 normally drives a worm wheel 22 fixed to an intermediate shaft 24. Also fixed on the intermediate shaft 24 is a feed drive gear 26 (FIG. 3). Both the worm wheel 22 and feed drive gear 26 are included in the feed driving train of gears. Pivotally received between the worm wheel 22 and feed drive gear 26 is a shifter bracket 28 which carries a cross feed idler gear 30 and a longitudinal feed idler gear 32, both of which are always engaged with the feed drive gear 26 and are included in the driving train of gears. These idler gears 30, 32 roll on the feed drive gear 26 as the shifter bracket 28 is pivoted. Located above the feed drive gear 26 (FIG. 2) is a cross feed gear 33 which is fixed on the end of a cross feed screw 34. The cross feed screw 34 extends across the saddle 13 and is engaged with the cross slide 15 such that when the screw 34 is rotated the cross slide moves in cross feed on the saddle 13. The cross feed gear 33 and the feed drive gear 26 are spaced such that the cross feed idler gear 30 may be rolled on the feed drive gear 26 to a position where the cross feed idler gear 30 engages both the feed drive gear 26 and the cross feed gear 33 and transmits power to the cross feed screw 34. Located below the feed drive gear 26 is a longitudinal feed gear 36 which is positioned relative to the feed drive gear 26 such that the longitudinal feed idler gear 32 may be rolled on the feed drive gear 26 to a position where it engages both the feed drive gear 26 and the longitudinal feed gear 36. The longitudinal feed gear 36 drives a train of gears 38, 40, and 42 (FIGS. 2, 1). Gear 42 is engaged with a rack (not shown) on the machine ways and when the longitudinal feed idler gear 32 is engaged with the longitudinal feed gear 36, the rotation of the feed bar 10 produces longitudinal feed movement of the saddle 13 and apron 12. Gear 41 is fixed on the end of a handwheel shaft 43. The handwheel 45 (FIG. 3) is fixed on the handwheel shaft 43 and may be used to manually position the apron 12 longitudinally.

Figure 4:
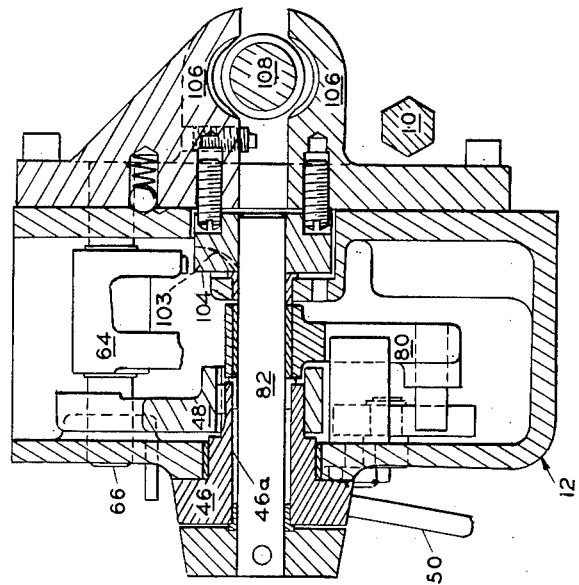
FIG. 4 is a section of FIG. 2 taken on line 4—4.

The shifter bracket 28 is selectively pivoted to effect cross feed and longitudinal feed by operation of a feed control member or bracket 48 fixed to a cylindrical shaft portion 46a of a feed control bushing 46 extending into the apron 12, as shown in FIG. 4. The cross feed selector 50 is fixed to the feed control bushing 46 to effect pivotal movement thereof. The feed control bracket 48 may be placed in one of three feed positions; neutral, cross feed, and longitudinal feed. The feed control bracket 48 has a cross feed lobe 52 (FIG. 2) to which one end of a cross feed connecting link 54 is pivotally connected. The other end of the connecting link 54 is pivotally connected to the upper end of the shifter bracket 28. The control bracket 48 also has a longitudinal feed lobe 56 to which one end of a longitudinal feed connecting link 58 is pivotally attached. The other end of the longitudinal feed connecting link 58 is pivotally fastened to the lower end of the shifter bracket 28. The cross feed lobe 52 of the control bracket 48 and the cross feed connecting link 54 each form a segment of an arm which pushes the shifter bracket 28 counter-clockwise (as viewed in FIG. 2) as the control bracket is turned counter-clockwise to the cross feed position by operation of the selector handle 50. In turning the control bracket 48 in that direction, the arm extends to a substantially straight position.

Figure 6:
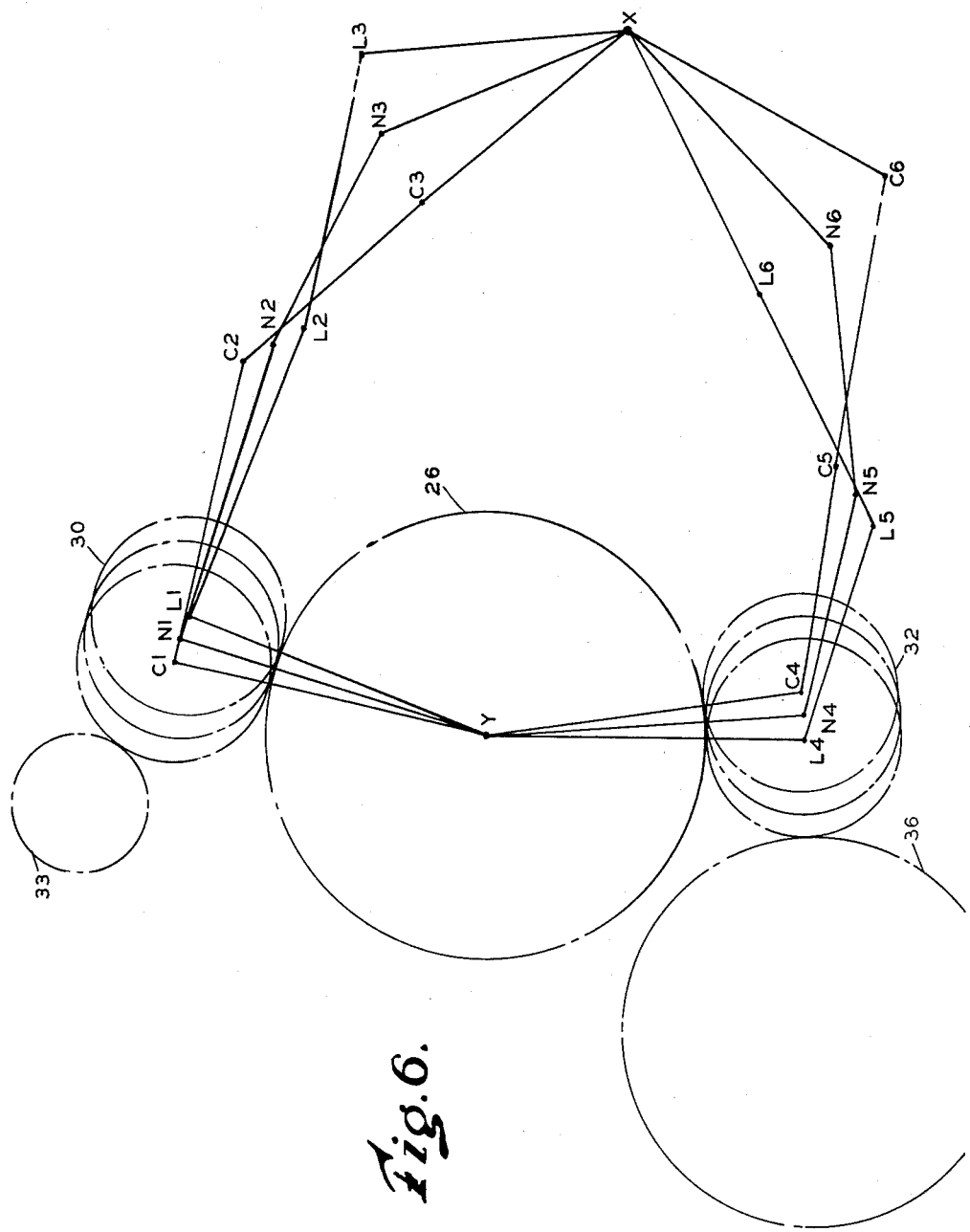
FIG. 6 is a diagrammatic representation of alternate positions of members shown in FIG. 2.

FIG. 6 illustrates diagrammatically the relative changes in position of the members of the mechanism when the mechanism is in a feed condition. With the control bracket 48 in its neutral position, the locations of centers of the following points are indicated as: N1, the cross feed idler gear 30; N2, the pivotal connection between the shifter bracket 28 and the cross feed connecting link 54; N3, the pivotal connection of the cross feed connecting link 54 and the control bracket 48; N4, the longitudinal feed idler gear 32; N5, the pivotal connection between the shifter bracket 28 and the longitudinal feed connecting link 58; and N6, the pivotal connection of the longitudinal feed connecting link 58 and the control bracket 48. When the control bracket 48 is in the cross feed position, the locations of the same centers are designated as C1, C2, C3, C4, C5, and C6 respectively. With the control bracket 48 in the longitudinal feed position, the same center locations are designated as L1, L2, L3, L4, L5, and L6 respectively. Point X is the center about which the control bracket 48 pivots and point Y is the center of the intermediate shaft 24 on which the shifter bracket 28 is pivotally received. When the control bracket 48 is turned from the neutral position to the cross feed position, the angle N2, N3, X straightens out to form the substantially straight angle C2, C3, X and the center of the cross feed idler gear 30 moves from N1, to C1. The cross feed idler gear 30 engages both the cross feed gear 33 and the feed drive gear 26. At the same time the angle N5, N6, X becomes more acute to form the angle C5, C6, X. If the control bracket 48 is turned to the longitudinal feed position, angle N5, N6, X straightens out to form angle L5, L6, X and angle N2, N3, X becomes more acute to form angle L2, L3, X. The longitudinal feed idler gear 32 then engages both the longitudinal feed gear 36 and the feed drive gear 26 as the center of the longitudinal feed idler gear moves from N4 to L4. The cross feed and longitudinal feed connecting links 54, 58 are pivotally connected to the control bracket and the pivotal connections are slidably received in the connecting links for limited movement along the longitudinal axes thereof. When the control bracket 48 is in the cross feed position, leg C5, C6 of angle C5, C6, X is longer than leg N5, N6 of angle N5, N6, X. If the control bracket 48 is in the longitudinal feed position, leg L2, L3 of the angle L2, L3, X is elongated.

Figure 5:
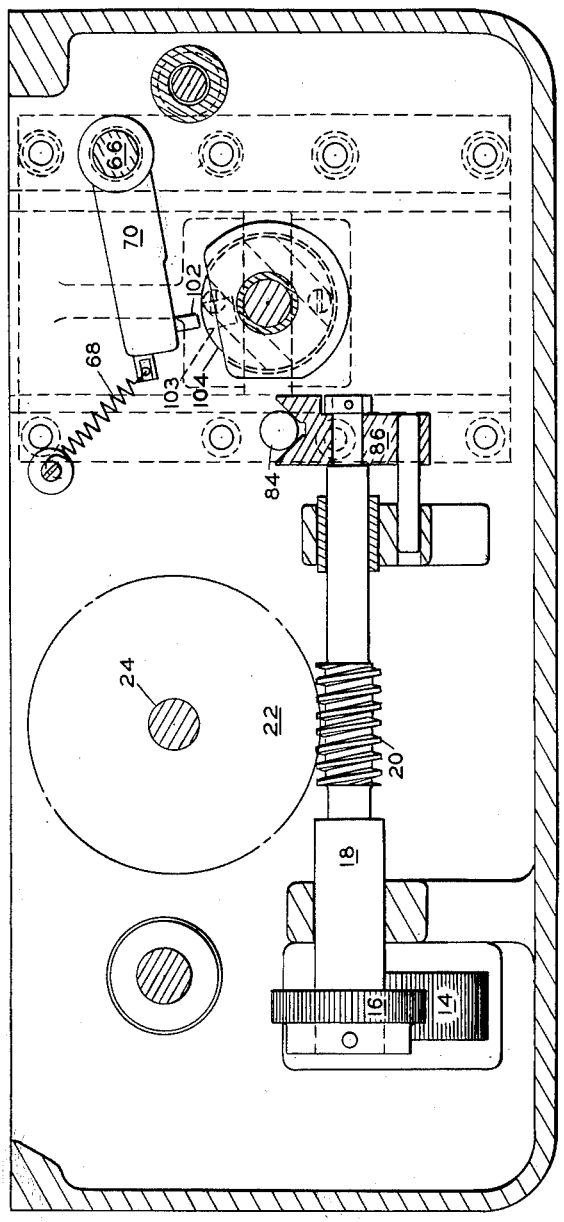
FIG. 5 is a section of FIG. 1 taken on line 5—5.

A detent lobe 60 (FIG. 2) extends from the control bracket 48 and is engaged by a detent roller 62 mounted on a detent fork 64 which is pivotally fixed to the apron housing 12 by a stud 66. The detent roller 62 is biased toward the control bracket 48 by a spring 68 (FIG. 5) attached between a leg 70 of the detent fork 64 and the apron housing 12. With the cross feed idler gear 30 (FIG. 2) engaged with the cross feed gear 33, the detent fork 64 pivots counterclockwise and the roller 62 moves out of the detent notch 72 to the surface 74. Since the roller 62 is biased toward the control bracket 48 by the spring 68 (FIG. 5) when the control bracket 48 is in the cross feed position the detent spring 68 produces a force tending to turn the control bracket 48 counter-clockwise. The control bracket 48 (FIG. 2) has a stop screw 76 which engages a stop pin 78 carried by a feed disconnect member 80. The disconnect member 80 is pivotally mounted around a half-nut control shaft 82 which extends through the bushing 46 and shaft portion 46a thereof and carries a cam follower 84 which is received in a V-cam 86 (FIG. 5). The V-cam 86 stops rotation of the disconnect member 80 which is held against the cam 86 by a spring 88 (FIG. 2) fixed between the disconnect member and a spring tension adjustment member 89 in the bottom of the apron housing 12. The cam member 86 prevents the disconnect member 80 from rotating beyond a fixed counter-clockwise point. The detent roller 62 tends to force the control bracket 48 to pivot counter-clockwise and the control bracket 48 tends to rotate the disconnect member 80 counter-clockwise to add to the force holding the cam follower 84 against the cam 86 when the control bracket 48 is in the cross feed position. The counter-clockwise rotation of the control bracket 48 is stopped by the cam 86 and the control bracket 48 is held in the cross feed position.

The torque control shaft 18 (FIG. 5) is rotatably received through the V-cam 86 and moves axially therewith. The follower 84 and disconnect member are biased down into the V-cam by the spring 88 (FIG. 2). Also, when the control bracket 48 is in either of the feed positions, the detent spring 68 adds a bias force through the mechanism associated with the control bracket 48 and the disconnect lever 80 tending to hold the follower 84 in the V-cam. The follower 84 seeks the bottom of the V-cam surface and tends to center the V-cam 86 relative to the follower 84 since the cam follower 84 can move only up and down in an arc and the cam 86 can move only reciprocally side to side. The follower 84 (FIG. 5) then transmits a bias component from the bias spring 88 and the detent spring 68 through the cam 86 to the torque control shaft 18 which moves that shaft and worm gear 20 to a normal center position relative to the supporting apron housing 12 and worm wheel 22. Assume now, that the cross slide 15 encounters a stop (not shown) on the saddle 13 and the resistive torque becomes greater than the total bias component transmitted to the torque control shaft 18 causing the worm wheel 22 to tend to stop rotating. The worm 20 continues to rotate, being driven by gears directly connected to the feed bar 19. As the worm 20 continues to rotate, the reactive force in the worm 20, which is equal to the force of the resistive torque transmitted to the worm wheel 22, becomes greater than the force of the total bias component which holds the worm 20 fixed relative to the worm wheel 22 and the worm 20 yields in an axial direction causing the worm wheel 22 to stop rotation. The worm wheel 22 now functions as a fixed nut and the worm 20 moves axially carrying the torque control shaft 18 and the V-cam 86 along. When the V-cam 86 moves axially, the cam follower 84 is forced upward by one of the cam surfaces. In moving upward, the follower 84 moves the disconnect member 80 (FIG. 2) clockwise (as viewed in FIG. 2) which in turn causes the control bracket 48 to move clockwise. At the instant that the detent roller 62 passes the corner between the surface 74 and the notch 72 the effect of the detent force changes direction to force the control bracket 48 rapidly clockwise until the detent roller 62 is seated in the center of the detent notch 72. This places the control bracket 48 in the neutral position and the cross feed idler gear 30 is disengaged from the cross feed gear 33. The worm wheel 22 can again turn and the worm 20 is returned to the normal center position by the bias of spring 88.

Suppose now, that the feed selector handle 50 is placed in the longitudinal feed position. This turns the control bracket 48 clockwise (as viewed in FIG. 2) to the longitudinal feed position and the detent roller 62 is moved out of the notch 72 to the surface 90 just past the corner between the surface 90 and the notch 72. In that position, the detenting force from the spring 68 (FIG. 5) tends to move the control bracket 48 further to the right in a clockwise direction. The stop screw 92 in the detent lobe 60 of the control bracket 48 now engages the idler lever 94 turning it counter-clockwise around a stud 96 in the apron housing 12 until the idler lever 94 engages a stop pin 98 in the arm 100 of the disconnect member 80 tending to turn the disconnect member 80 counter-clockwise. The disconnect member 80 is stopped by the V-cam 86 as it was when the control bracket 48 was in the cross feed position. The longitudinal feed is now in operation and when the saddle 13 reaches a stop (not shown) on the machine ways, the worm wheel 22 again stops rotating. The cam follower 84 (FIG. 5) is again forced upward as the torque control shaft 18 and V-cam 86 are carried axially by the worm gear 20. The disconnect member 80 (FIG. 2) moves clockwise forcing the idler lever 94 clockwise which in turn forces the control bracket 48 counter-clockwise. The detent roller 62 passes the corner between the surface 90 and the detent notch 72 and the control bracket 48 and shaft 82 snap to the neutral position and the longitudinal feed idler 32 is disengaged from the longitudinal feed gear 36.

FIGS. 2 and 5 show that the detent fork arm 70 carries a locking pin 102 which drops into a lock slot 103 in a bushing 104 when the detent roller 62 is out of the detent notch and on either of the surfaces 74 and 90 at which time the detent fork is caused to swing in a counter-clockwise direction from the position shown. The bushing 104 rotates with a thread select handle 105 (FIG. 1) which is fixed on the half nut control shaft 82. The half nut control shaft 82 extends through the feed control bushing 46 and shaft portion 46a and is used to engage the half nuts 106 (FIG. 4) with a rotatable lead screw 108 extending from the headstock parallel to the feed bar 10 to produce a thread feed when the machine is used for thread chasing operations. The locking pin 102, when in the slot 103, prevents movement of the thread select handle 105 from a neutral position and thus prevents simultaneous engagement of the normal feed driven from the feed bar 10 and the thread feed. Also, if the half nuts 106 are engaged, the cross and longitudinal feeds are not available since the locking pin 102 must move into the lock slot 103 before the control bracket 48 can be rotated to either the cross feed or longitudinal feed position. If the half nuts 106 are engaged with the lead screw 108, the slot 103 is moved away from the pin 102 to prevent that pin from entering the slot 103.

With this invention automatic feed disconnect means and dual feed control are included in one mechanism and operated by the use of one control member 48. The control member 48 is conveniently movable to the feed positions and the neutral position. The complete system is enclosable in a lathe apron 12 and does not increase the size of the lathe or the space required for use of the machine.

What is claimed is:

1. In a lathe apron housing having a drive shaft to effect cross feed movement of a tool carrier when said drive shaft is selectively connected to a cross feed gear and to effect longitudinal feed movement of said member when selectively connected to a longitudinal feed gear, said feed gears producing a resistive torque when driven by said drive shaft, a feed control mechanism responsive to a predetermined resistive torque to stop said feed movement comprising in combination, a driving train of gears connected to said drive shaft and including a cross feed idler gear, a longitudinal feed idler gear, a worm gear, a worm wheel, and a driving gear; a feed control shaft pivotally mounted in said apron housing having a cross feed position, a longitudinal feed position, and an intermediate neutral position; a feed control member fixed on said feed control shaft and having a cross feed linking member and a longitudinal feed linking member, said linking members having one end connected to said feed control member; an intermediate shaft rotatably mounted in said apron housing having said driving gear and said worm wheel fixed thereto and a shifter bracket pivotally received thereon, said shifter bracket connected to said linking members and having said idler gears rotatably fixed thereto and engaged with said driving gear; means selectively to pivot said control shaft to said neutral, cross feed, and longitudinal feed positions to move said linking members to effect respectively disengagement of said idler gears and said feed gears, engagement of said cross feed idler gear and cross feed gear, and engagement of said longitudinal feed idler gear and longitudinal feed gear; detent means to bias said control shaft in said neutral, cross feed, and longitudinal feed positions; an axially movable, rotatable torque control shaft received in said apron housing and having a centered position, said torque control shaft having said worm gear fixed thereto and a V-cam member movable axially therewith, said worm gear engaged with and driving said worm wheel; a disconnect member in contact with said V-cam and operable to overcome said detent bias and move said feed control shaft to the neutral position from the cross feed and longitudinal feed positions when said V-cam moves axially; and additional bias means acting on said disconnect member to hold said V-cam and torque control shaft in said centered position until the resistive torque equals said predetermined resistive torque, said torque control shaft and worm gear moving axially when the resistive torque is greater than said predetermined resistive torque to operate said disconnect member and stop feed movement.

2. In a lathe apron housing having a drive shaft to effect cross feed movement of a tool carrier when said drive shaft is selectively connected to a cross feed gear and to effect longitudinal feed movement of said member when selectively connected to a longitudinal feed gear, said feed gears producing a resistive torque when driven by said drive shaft, a feed control mechanism responsive to a predetermined resistive torque to stop said feed movement comprising in combination, a driving train of gears connected to said drive shaft and including a cross feed idler gear, a longitudinal feed idler gear, a worm gear, a worm wheel, and a driving gear; a feed control shaft pivotally mounted in said apron housing having a neutral position, a cross feed position, and a longitudinal feed position; a feed control bracket fixed on said feed control shaft having a cross feed lobe and a longitudinal feed lobe; an elongated cross feed linking member having one end pivotally connected to said cross feed lobe and defining therewith a cross feed angle; an elongated longitudinal feed linking member having one end pivotally connected to said longitudinal feed lobe and defining therewith a longitudinal feed angle; an intermediate shaft rotatably mounted in said apron housing having said driving gear and said worm wheel fixed thereto; a shifter bracket pivotally received on said intermediate shaft having said idler gears rotatably fixed thereon and engaged with said driving gear on said intermediate shaft, said shifter bracket pivotally connected to said linking members; means selectively to pivot said control shaft to said neutral, cross feed, and longitudinal feed positions, said cross feed angle becoming a substantially straight angle and said longitudinal feed angle becoming more acute when said control shaft is pivoted to the cross feed position to effect a pivotal movement of said shifter bracket to engage said cross feed idler gear and cross feed gear, said longitudinal feed angle becoming a substantially straight angle and said cross feed angle becoming more acute when said control shaft is pivoted to said longitudinal feed position to effect a pivotal movement of said shifter bracket to engage said longitudinal feed idler gear and said longitudinal feed gear; detent means to bias said control shaft in said neutral, cross feed, and longitudinal feed positions; an axially movable, rotatable torque control shaft received in said apron housing and having a centered position, said torque control shaft having said worm gear fixed thereto and a V-cam member axially movable therewith, said worm gear engaged with and driving said worm wheel; a disconnect member in contact with said V-cam and operable to overcome said detent bias and move said feed control shaft to the neutral position from the cross feed and longitudinal feed positions when said V-cam moves axially; and additional bias means acting on said disconnect member to hold said V-cam and control shaft in said centered position until the resistive torque equals said predetermined resistive torque, said torque control shaft and worm gear moving axially when the resistive torque is greater than said predetermined resistive torque to operate said disconnect member and stop feed movement.

3. In a lathe apron housing having a drive shaft to effect cross feed movement of a tool carrier when said drive shaft is selectively connected to a cross feed gear and to effect longitudinal feed movement of said member when selectively connected to a longitudinal feed gear, said feed gears producing a resistive torque when driven by said drive shaft, a feed control mechanism responsive to a predetermined resistive torque to stop said feed movement comprising in combination, a driving train of gears connected to said drive shaft and including a cross feed idler gear, a longitudinal feed idler gear, a worm gear, a worm wheel, and a driving gear; a feed control shaft pivotally mounted in said apron housing having a neutral position, a cross feed position, and a longitudinal feed position; a feed control bracket mounted on said control shaft having a cross feed lobe and a longitudinal feed lobe; an elongated cross feed linking member having one end pivotally connected to said cross feed lobe and defining therewith a cross feed angle; an elongated longitudinal feed linking member having one end pivotally connected to said longitudinal feed lobe and defining therewith a longitudinal feed angle; an intermediate shaft rotatably mounted in said aprong housing having said driving gear and said worm wheel fixed thereto; a shifter bracket pivotally received on said intermediate shaft having said idler gears rotatably received thereon and engaged with said driving gear on said intermediate shaft, said shifter bracket pivotally connected to said linking members; means selectively to pivot said control shaft to said neutral, cross feed, and longitudinal feed positions, said cross feed angle becoming a substantially straight angle and said longitudinal feed angle becoming more acute when said control shaft is pivoted to said cross feed position to effect a pivotal movement of said shifter bracket to engage said cross feed idler gear and cross feed gear, said longitudinal feed angle becoming a substantially straight angle and said cross feed angle becoming more acute when said control shaft is pivoted to said longitudinal feed position to effect pivotal movement of said shifter bracket to engage said longitudinal feed idler gear and said longitudinal feed gear; detent means to bias said control shaft in said neutral, cross feed, and longitudinal feed positions; an axially movable rotatable torque control shaft received in said apron housing and having a normal centered position, said torque control shaft having said worm gear fixed thereto and a V-cam member axially movable therewith, said worm gear engaged with and driving said worm wheel; an idler lever pivotally mounted in said apron housing and in contact with said control bracket when the control shaft is in one of said feed positions; a disconnect member pivotally received on said control shaft and in contact with said V-cam, said disconnect member contacted by said idler lever when the control shaft is in one of said feed positions and contacted by said control bracket when said control shaft is in the other of said feed positions, said disconnect member shifted by axial movement of the V-cam to rotate the control shaft from the feed positions to the neutral position; and additional adjustable bias means acting on said disconnect member to hold said V-cam and control shaft in said centered position until the resistive torque equals said predetermined resistive torque, said torque control shaft and said worm gear moving axially when the resistive torque is greater than said predetermined resistive torque to pivot said disconnect member and stop feed movement.

4. In a lathe apron housing having a drive shaft to effect cross feed movement of a tool carrier when said drive shaft is selectively connected to a cross feed gear and to effect longitudinal feed movement of said member when selectively connected to a longitudinal feed gear, said feed gears producing a resistive torque when driven by said drive shaft, a feed control mechanism responsive to a predetermined resistive torque to stop said feed movement comprising in combination, a driving train of gears connected to said drive shaft and including a cross feed idler gear, a longitudinal feed idler gear, a worm gear, a worm wheel, and a driving gear; a pivotally movable control member having a cross feed position, a longitudinal feed position, and an intermediate neutral position; an intermediate shaft rotatably mounted in said apron housing and having said driving gear and worm wheel fixed thereto and a shifter bracket having said idler gears rotatably fixed thereto and engaged with said driving gear; means to connect said bracket to said control member for pivotal movement therewith whereby said cross feed idler gear is engaged with said cross feed gear and said longitudinal feed idler gear is engaged with said longitudinal feed gear when said control member is in the cross feed and longitudinal feed positions respectively; an axially movable and rotatable torque control shaft having said worm gear fixed thereon; means to hold said torque control shaft in a normal driving position until said resistive torque produced at said feed gears is greater than said predetermined resistive torque when said control shaft shifts axially; and means responsive to axial shifting of said torque control shaft away from said normal driving position to rotate said control member to the neutral position from said feed positions to stop feed movement of the tool carrier.

5. In a lathe apron housing having a drive shaft to effect cross feed movement of a tool carrier when said drive shaft is selectively conected to a cross feed gear and to effect longitudinal feed movement of said member when selectively connected to a longitudinal feed gear, said feed gears producing a resistive torque when driven by said drive shaft, a feed control mechanism responsive to a predetermined resistive torque to stop said feed movement comprising in combination, a driving train of gears connected to said drive shaft and including a cross feed idler gear, a longitudinal feed idler gear, a worm gear, a worm wheel, and a driving gear; a pivotally movable control member having a cross feed position, a longitudinal feed position, and an intermediate neutral position and having a cross feed linking member and a longitudinal feed linking member each having one end connected to said control member; an intermediate shaft rotatably mounted in said apron housing and having said driving gear and said worm wheel fixed thereto; a shifter bracket rotatably received on said intermediate shaft having said idler gears fixed thereto and engaged with said driving gear, said shifter bracket connected to each of said linking members whereby said control member and shifter bracket rotate together and said cross feed idler gear is engaged with said cross feed gear and said longitudinal feed idler gear is engaged with said longitudinal feed gear when said control member is in said cross feed and longitudinal feed positions respectively; detent means yieldably to hold said control member in said feed and neutral position; an axially movable and rotatable torque control shaft having said worm gear fixed thereon; means yieldably to hold said torque control shaft in a normal driving position until said resistive torque produced at said feed gears is greater than said predetermined resistive torque when said control shaft shifts axially; and means responsive to axial shifting of said torque control shaft away from said normal driving position to overcome said detent means and rotate said control member to the neutral position from said feed positions to stop movement of the tool carrier.

6. An automatically disconnectable machine tool feed transmission comprising in combination, a slide having a feed gear connected thereto for effecting movement thereof when said feed gear is rotated; a rotating drive shaft to power said feed gear, said feed gear producing a resistive torque when driven by said drive shaft; a driving train of gears between said drive shaft and feed gear and including an idler gear, a worm gear, a worm wheel, and a driving gear; a pivotally movable control member having a neutral position and a feed position; a rotatable intermediate shaft having said driving gear and worm gear fixed thereto; a shifter bracket rotatably received on said intermediate shaft, said shifter bracket having said idler gear rotatably fixed thereto and engaged with said driving gear; a connecting linkage between said control member and shifter bracket to effect pivotal movement of said shifter bracket with said control member whereby said idler gear is engaged with said feed gear when said control member is in said feed position; an axially movable and rotatable torque control shaft having said worm gear fixed thereon; means to hold said torque control shaft in a normal driving position until said resistive torque at said feed gear reaches a predetermined level when said torque control shaft shifts axially; and means responsive to axial movement of said torque control shaft away from said normal driving position to rotate said control member to the neutral position to disconnect said feed gear from said drive shaft.

References Cited in the file of this patent

UNITED STATES PATENTS 2,484,616    Dulaney _____ Oct. 11, 1949

FOREIGN PATENTS 414,469    Great Britain _____ Aug. 9, 1934